(12) United States Patent
Wilson et al.

(10) Patent No.: US 6,714,976 B1
(45) Date of Patent: Mar. 30, 2004

(54) SYSTEMS AND METHODS FOR MONITORING DISTRIBUTED APPLICATIONS USING DIAGNOSTIC INFORMATION

(75) Inventors: James Wilson, Needham, MA (US); Neeraj Agarwal, Manchester, NH (US); Gary Fernandez, Concord, MA (US); Murtaza Doctor, Andover, MA (US); Ken Kane, Acton, MA (US); Albert Briner, Hollis, NH (US); Sehkar Muddana, Waltham, MA (US); Pieter deGroot, Dunstable, MA (US); John Lyon-Smith, Westford, MA (US); Scott Mendel, Lowell, MA (US)

(73) Assignee: Concord Communications, Inc., Marlboro, MA (US)

( * ) Notice: Subject to any disclaimer, the term of this patent is extended or adjusted under 35 U.S.C. 154(b) by 0 days.

(21) Appl. No.: 09/368,270

(22) Filed: Aug. 3, 1999

Related U.S. Application Data

(63) Continuation-in-part of application No. 08/821,698, filed on Mar. 20, 1997, now Pat. No. 5,958,010.
(60) Provisional application No. 60/137,121, filed on Jun. 2, 1999, and provisional application No. 60/095,142, filed on Aug. 3, 1998.

(51) Int. Cl.$^7$ .......................... G06F 15/173; G06F 9/46; G06F 11/00
(52) U.S. Cl. ........................... 709/224; 709/318; 714/4
(58) Field of Search .............................. 709/203, 223, 709/224, 232, 105, 317, 318; 370/241, 248, 252, 253; 714/4, 25, 48, 51

(56) References Cited

U.S. PATENT DOCUMENTS

| | | | |
|---|---|---|---|
| 5,101,402 A | | 3/1992 | Chiu et al. |
| 5,430,709 A | | 7/1995 | Galloway |
| 5,648,966 A | | 7/1997 | Kondo et al. |
| 5,732,218 A | * | 3/1998 | Bland et al. ................. 709/224 |
| 5,958,010 A | * | 9/1999 | Agarwal et al. ............. 709/223 |
| 6,058,102 A | * | 5/2000 | Drysdale et al. ............ 370/248 |

(List continued on next page.)

FOREIGN PATENT DOCUMENTS

| | | | |
|---|---|---|---|
| WO | WO 9957649 A | * | 11/1999 |
| WO | WO 0008806 | * | 2/2000 |

OTHER PUBLICATIONS

Muller, Nathan J. "Improving Network Operations with Intelligent Agents", ACM International Journal of Network Management, vol. 7, pp. 116–126, 1997.*

Case, J. et al., "A Simple Network Management Protocol (SNMP)", RFC 1157, pp. 1–36, May 1990.*

Waldbusser, S. "Remote Monitoring Management Information Base", RFC 1757, pp. 1–91, Feb. 1995.*

(List continued on next page.)

Primary Examiner—Jason D. Cardone
(74) Attorney, Agent, or Firm—Hale and Dorr LLP

(57) ABSTRACT

Systems and methods for automated monitoring and management of distributed applications, client/server databases, networks and systems across heterogeneous environments. Distributed, automated intelligent monitoring agents use embedded sensing technology which is knowledgeable of application protocols, to monitor continuously the network environment in real time. To this end, the monitoring agent can be located on each client and server in the network. The monitoring agent can couple to the communications stack for monitoring the data that is being passed between the client and the network, of a server in the network. The data can be collected and employed for trouble shooting trend analysis, resource planning, security auditing, and accounting as well as other applications. Also included is a controller for remotely coordinating the data gathering process from the various clients and servers.

44 Claims, 14 Drawing Sheets

U.S. PATENT DOCUMENTS

| | | | | |
|---|---|---|---|---|
| 6,122,664 | A | * | 9/2000 | Boukobza et al. ........... 345/418 |
| 6,141,686 | A | * | 10/2000 | Jackowski et al. .......... 709/105 |
| 6,167,448 | A | * | 12/2000 | Hemphill et al. ........ 707/501.1 |
| 6,397,359 | B1 | * | 5/2002 | Chandra et al. ............ 714/712 |
| 6,404,743 | B1 | * | 6/2002 | Meandzija ................... 345/736 |
| 6,625,648 | B1 | * | 9/2003 | Schwaller et al. .......... 709/224 |
| 2002/0049687 | A1 | * | 4/2002 | Helsper et al. ............... 706/45 |

OTHER PUBLICATIONS

Case, J. et al., "Transport Mappings for Version 2 of the Simple Network Management Protocol (SNMPv2)", RFC 1906, pp. 1–13, Jan. 1996.*

FirstSense Software, Inc., PCT/US99/17531, search report, pp. 1–7, Feb. 2000.*

Stevens, Richard W. "Unix Nework Programming", Prentice Hall Series, pp. 173–177, 181–183, 186, and 374–386, 1990.*

Hunt, Ray, "SNMP, SNPMv2, and CMIP—the technologies for multivendor network management", Computer Communications 20 (1997), pp. 73–88, Nov. 1995.*

Henniger, Olaf et al., "Specification and testing of the behavior of network management agents using SDL–92", IEEE/ACM Transactions on Networking, pp. 951–962, Apr. 1996.*

Vassila et al., "Introducing Active Managed Objects for Effective and Autonomous Distributed Management", University College London (UK), (Oct. 16, 1995) pp. 415–429.

* cited by examiner

| EXCEPTION ID | THRESHOLD | DATA ID TO COLLECT AND COMPONENT TYPE | SYSTEM COMPONENTS FOR DATA GATHERING |
|---|---|---|---|
| A123 | 5 SECONDS | A, SERVER<br>B, CLIENT<br>C, CLIENT | CLIENT 1<br>SERVER 4<br>SERVER 5 |
| | | | |

| 280 ↗ | | |
|---|---|---|
| DATA COLLECTION ID 282 | DESCRIPTION 284 | CACHED VALUE, COMPONENT 286 |
| A | CLIENT CPU TIME | 3 SECONDS, CLIENT 1 |
| A | CLIENT CPU TIME | 2 SECONDS, CLIENT 2 |
| B | NO. OF REQUESTS BEING SERVICED | 5, SERVER 1 |
| B | NO. OF REQUESTS BEING SERVICED | 34, SERVER 2 |
| ... | ... | ... |

FIG. 12

SYSTEMS AND METHODS FOR MONITORING DISTRIBUTED APPLICATIONS USING DIAGNOSTIC INFORMATION

REFERENCES TO RELATED APPLICATIONS

This application claims priority from U.S. provisional patent application No. 60/095,142, filed Aug. 3, 1998, U.S. provisional patent application No. 60/137,121, filed Jun. 2, 1999, and is a continuation in part of U.S. application Ser. No. 08/821,698, filed Mar. 20, 1997, now U.S. Pat. No. 5,958,010, issued Sep. 28, 1999.

FIELD OF THE INVENTION

The invention generally relates to systems and methods for monitoring and managing distributed computing environments, and more particularly, to systems and methods for monitoring enterprise wide operation of a distributed computing system.

BACKGROUND OF THE INVENTION

A distributed computing architecture provides physical and logical distribution computing functions across many computers connected by a network system. Typically, the client initiates a service request to a server across the network. The server responds to the client's request by performing one or more database, file, printing, or other services. During the operation, the client and the server exchange data and individually perform data processing functions necessary for completing the operation. Complexity can arise because a single server can service multiple clients simultaneously, while a client can concurrently access the services of multiple servers. Moreover, servers can act as clients to other servers. Accordingly, distributed computer systems can have complex, multiple tiered distributed architectures.

Despite its complexity, distributed computing architectures have been successful in providing users with sophisticated and powerful systems for efficiently processing large amounts of data and providing rapid digital communication between multiple stations. The power of these systems has lead to the wide-spread proliferation of distributed computing architectures and has further resulted in the development of a plethora of distributed computing services such as client/server databases, distributed applications and networks across heterogeneous environments. Moreover, new technologies continue to fuel the growth of distributed systems. For example, the development of internet and intranet systems suitable for the commercial environment has created a burst of growth in the distributed computing field.

Although distributed computing architectures provide users with efficient and powerful tools, the complexity and sophistication of the architecture make the implementation, deployment, and operation of the actual systems difficult. For example, a typical relational client/server database system will include a database server for providing a number of database services to a plurality of clients. The distributed architecture generally requires that each client is capable of properly communicating with the server, and that the server is capable of coordinating the multiple service requests received from the clients and maintaining data coherency for a data repository that could be distributed among several network memory devices. Loading such a system onto a computer network is a difficult task, made complex because electronic communications occurring between clients elements and servers occurs asynchronously, intermittently and quite rapidly. Accordingly, complex diagnostic and management tools are used to implement these distributed systems and to analyze and improve performance.

The complexity of a distributed computing architecture makes diagnosing system failures and performance analysis a difficult task. The asynchronous and rapid nature of communications between the distributed network components complicates the task significantly. Accordingly, a diagnostic technician may have a difficult time in monitoring system operation in order to detect the events which cause system failure, or performance issues, such as performance bottlenecks, for example.

Responsive to this need for diagnostic and development tools, computer engineers have developed network monitoring systems which couple into the communication channels of the network to monitor transactions between clients and servers. These systems are often hardware devices that couple into the physical layer of the network system to monitor communications. Accordingly, this requires that each physical connection between a client and a server include an interconnected hardware device. These devices monitor the data transactions that occur. By generating records of these data transactions, a system technician can attempt to identify the events which lead to the system failure and performance degradation.

Although these systems work, they require that the hardware devices are capable of detecting and recording each data transaction that occurs between the client and the server. This requires that the hardware device read each packet of data being transferred across the network to determine if the data being sent is associated with the client or the server being monitored. However, the asynchronous and rapid nature of the data transactions that occur between clients and servers renders these devices susceptible to error for failure to detect every transaction that occurs. The technician may have only a partial record of the transactions which occurred between the client and the server, and therefore, an incomplete record that is unreliable for purposes of determining the cause of the system failure and performance problems.

Other management tools exist that map a centralized system management model onto a distributed environment by implementing an agent-console architecture. In this architecture, agents continuously poll the servers and log files for the system, the network, or the applications to collect usage data and to determine if any "exception" has occurred. The console is a central management station through which the command and control functions are implemented. This architecture has several shortcomings. First, the continuous polling function employs valuable resources and degrades server performance. This is particularly true for metrics that require fine grain analysis of system activity and require constant polling. Second, the agents are at the server component level. Thus, usage, performance and exception statistics are only available at the component level and no measure is provided for end-to-end resource utilization, and no measure of the other participating components is made. Also, data gathering provisions may not be performed in real-time.

An alternative approach proposed by certain framework vendors has included an application program interface (API) to a set of resources that management tools can employ to monitor system performance. This approach requires that existing distributed applications operating on the system be edited and re-compiled to include API calls to the various system monitoring resources. Accordingly, this is a generally as highly intrusive approach to system monitoring that is dependent upon the cooperation of every vendor providing an application program running on the distributed system.

SUMMARY OF THE INVENTION

In accordance with principles of the invention is a method of monitoring a distributed computer system. Trigger events and associated data to be collected are defined. The occurrence of one of the trigger events at a client is detected while monitoring a connection between a client and a first server. Client data is collected in accordance with the one trigger event at the client. A controller is notified of the detecting of the occurrence of the one trigger event. The first server is notified of the occurrence of the trigger event. First server data is gathered by the first server, and the first server data is sent to the controller.

In accordance with anther aspect of the invention is a system for monitoring a distributed computer system. Machine executable code defines trigger events and associated data to be collected. Machine executable code detects occurrence of one of the trigger events at a client while monitoring a connection between a client and a first server. Machine executable code collects client data in accordance with the one trigger event at the client. Machine executable code notifies a controller of the detecting of the occurrence of the one trigger event. Machine executable code notifies the first server of the occurrence of the trigger event. Machine executable code gathers first server data by the first server, and machine executable code send s the first server data to the controller.

BRIEF DESCRIPTION OF THE DRAWINGS

The features and advantages of the present invention will become more apparent from the following detailed description of exemplary embodiments thereof, taken in conjunction with the accompanying drawings, in which:

FIG. 12 is an example of an embodiment of a table of cached data values;

DETAILED DESCRIPTION

Figure 1:
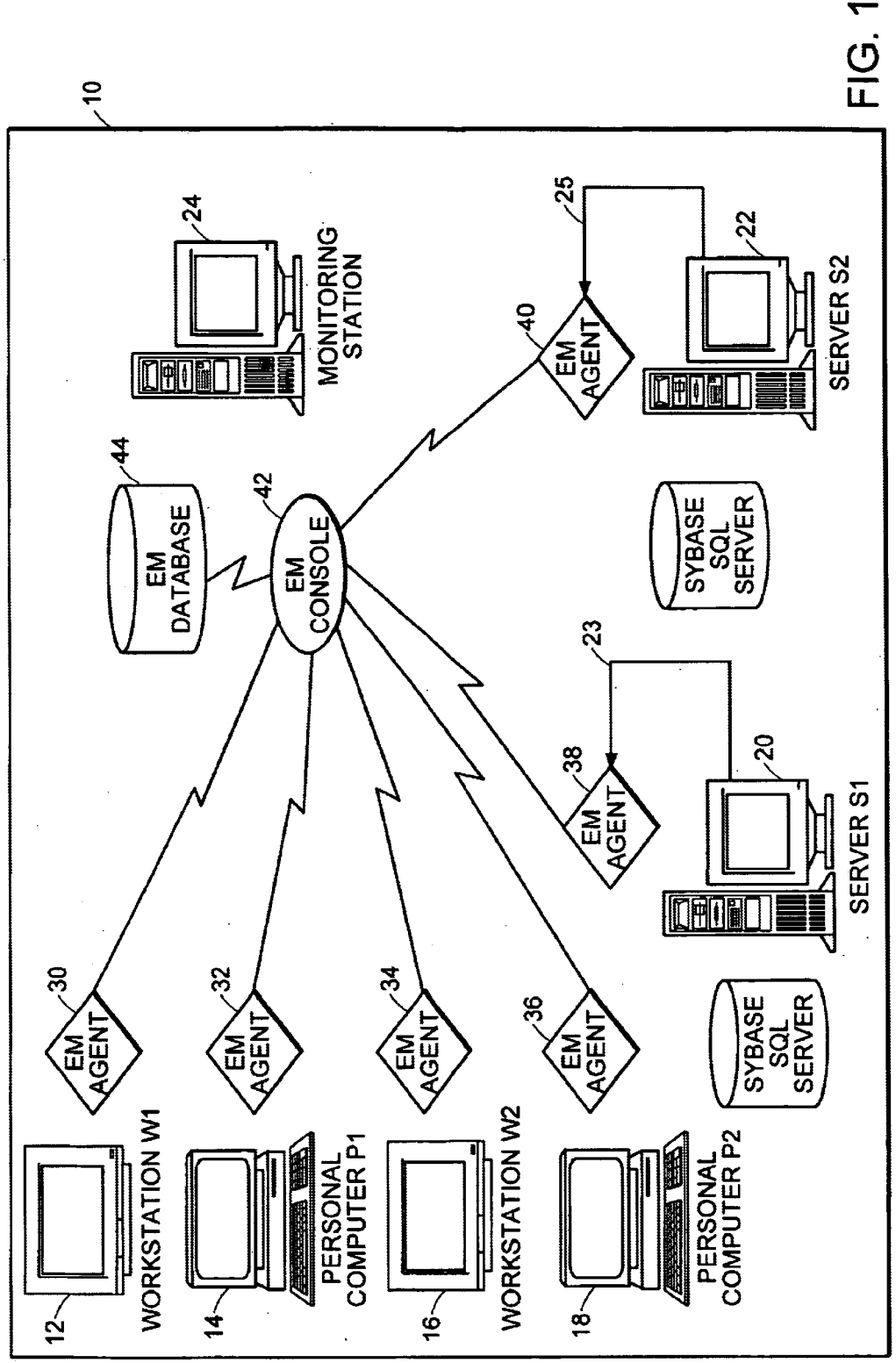
FIG. 1 is an example of an embodiment of a system according to the invention for providing automated monitoring and management of distributed applications.

FIG. 1 is an embodiment of a system 10 according to the invention for monitoring and managing a distributed application that includes multiple workstations, and servers. It will be understood that the system 10 may further include network devices such as printers and network memory devices, which are not shown in the drawing. In particular, FIG. 1 depicts workstations 12, 14, 16, and 18, server 20, server 22, Mission Universal Monitor (MUM) agents 30–40, MUM console module 42, MUM database 44, and monitoring station 24.

In the system 10, illustrated in FIG. 1, each of the workstations 12–18 is representative of a computer system coupled to a network suitable for carrying computer readable information. Each of the network nodes can communicate with either of the servers, 20 or 22 and request services therefrom. Accordingly, the system depicted in FIG. 1 has a distributed computing architecture that represents physical and logical distribution of computing functions across the different workstations, devices and servers.

FIG. 1 provides a general overview of the structure and operation of systems according to the invention that monitor this -distributed processing environment. The system 10 includes the MUM agents 30–40 and the MUM console 42 with the interconnected MUM database 44. Each of the MUM agents 30–40 is associated with the respective one of the workstations or server elements. Moreover, a monitoring agent is associated with each component of the network to provide for enterprise wide monitoring, as all the processes, including those that are distributed, on the clients and the servers can be monitored. Each MUM agent can physically reside on its associated workstations or server to monitor, inter alia, the data that is being exchanged between a program operating on the workstation and a selected one or more of the servers 20 or 22.

Consequently, the processing of every device on the network can be monitored, and each of the depicted agents 30–40 can couple to the MUM console module 42 to pass information representative of the collected data to the MUM console 42. The MUM console 42 can store this information within the central database 44 for analysis by an operator (e.g., a system technician or system administrator). Alternatively, the agents can provide information directly to the MUM database. An application program running on the console 42, or any other system, can view the collected data to show at the component level and at the enterprise level, system performance of any process or component of the enterprise. Moreover, the system administrator can develop enterprise level usage statistics and response times, develop charts and reports and perform any other relevant data analysis for determining user-defined statistics relevant to the operation of the enterprise.

Accordingly, it is the function of the MUM agents 30–40 to collect data. To this end, each of the depicted MUM agents 30–40 can be an intelligent monitoring agent that is located on the managed nodes in the enterprise, wherein any node having an agent is deemed to be a managed node. In the system 10 depicted in FIG. 1, each of the nodes on the enterprise has a respective MUM agent, however, it should be apparent to one of ordinary skill in the art of computer engineering, that the number of MUM agents deployed across the enterprise is variable and can be selected according to the character of the application. The MUM agents can be software modules, such as C++ generated computer programs, that execute on the depicted workstations and servers to configure the servers, workstations and network into systems according to the invention. However, it will be apparent to those of ordinary skill in the art that the MUM agents can be hardware devices, such as electronic circuit card assemblies coupled into the backplane of the individual managed nodes, that monitor operations of the local system, or can be a combination of hardware and software devices. Any of these embodiments can be practiced with the present invention without departing from the scope thereof.

Each of the MUM agents 30–40 can operate autonomously to monitor multiple components including local processor performance, local processor resources, local processor configuration, the operation of the distributed application, the operation of the network, the operation of the various network devices including disks, file systems devices and tape, and other such information. Accordingly, it is a realization of the invention that diagnostic analysis can employ more than a measure of server CPU performance. Each of the monitoring agents 30–40 can be a single, multi-threaded process that can contain information to avoid constant polling by the enterprise monitor console 42. Each of the agents can continuously monitor in real time business transactions, databases, systems and networks detecting and correlating events, initiating corrective actions, and providing event notifications. The MUM agents are capable of understanding business transactions and can collect details of events, resource usage and response times and can pass this information to the MUM console 42 and store it in the MUM database 44.

Each of the agents 30–40 can also monitor loop back operations. As shown, loop back 23, 25 occurs when a server and a distributed application are located on the same client. Loop back information passes between the server and the application via the communication stack without ever going out onto the network. Because each agent 38, 40 is coupled into the client communications stack, it can monitor the loop back data that passes only through the communications stack.

Figure 2:
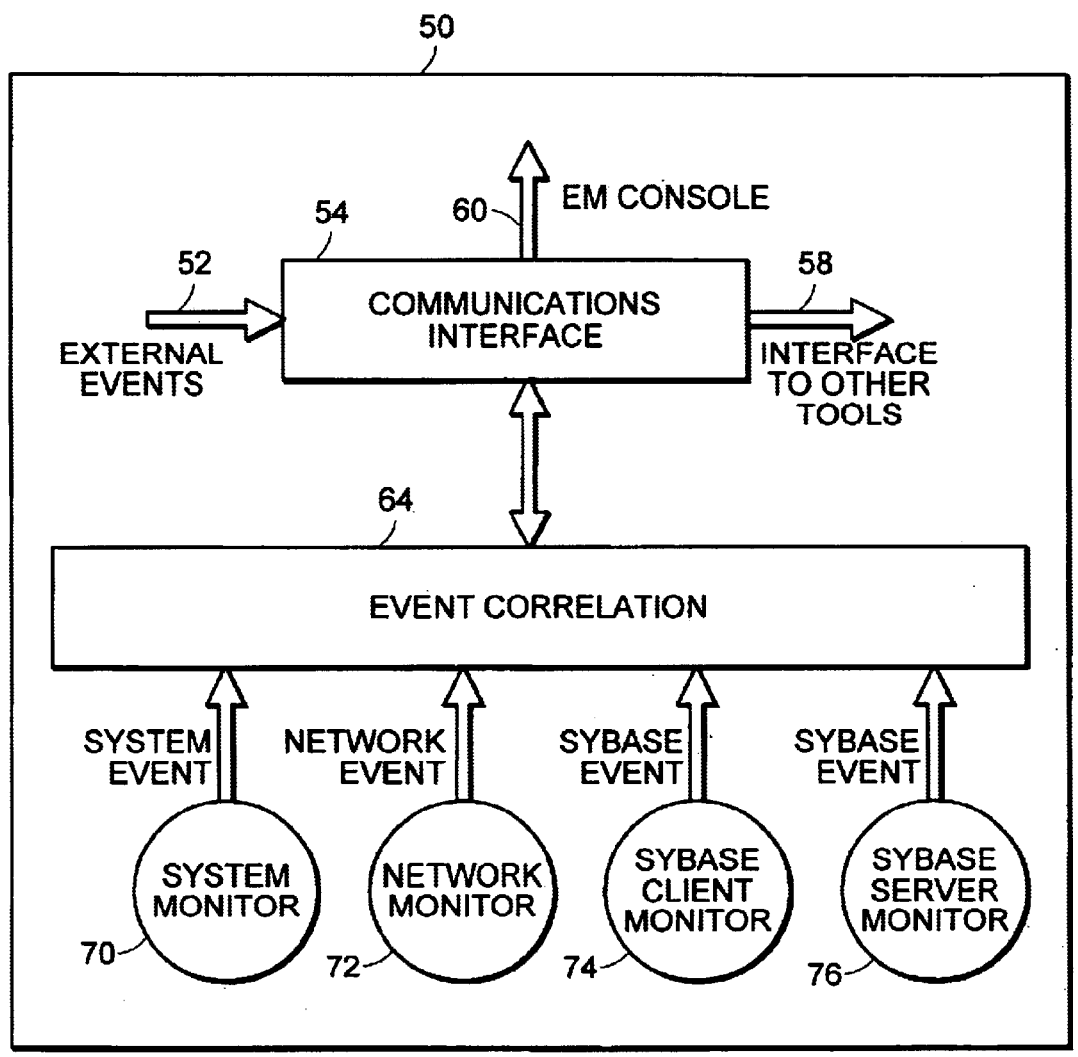
FIG. 2 is an example of an embodiment of a block diagram of a monitoring agent suitable for practice with a system depicted in FIG. 1.

FIG. 2 depicts in functional block diagram form the architecture of one MUM agent 50 suitable for use with the system 10 depicted in FIG. 1. The agent 50 can be a software module that executes as a background process on the managed node. In particular, the agent 50 can be an agent residing on a network node that is capable of acting as a SYBASE™ client. The agent 50 includes an external event interface 52, a communications interface 54, a tools interface 58, and MUM console interface 60, and event correlation processor 64, a system monitor 70, a network monitor 72, a SYBASE™ client monitor 74, and a SYBASE™ server monitor 76.

The overall architecture of the agent 50 shows that the agent includes a set of monitor elements 70–76 and an external events interface 52 that provide event information about various components of the enterprise to the correlation processor 64. The correlation processor 64 correlates the events to generate data that can be passed to the MUM console 42, or passed to other tools, including other management tools or instrumentation code for setting off alarms, activating a beeper, sending a fax via modem, sending e-mail to system administrators or taking corrective action. Accordingly, the agent 50 collects details of events and processes these details in the correlation processor 64 to generate information representative, among other things, of business transactions.

To this end the external events interface 52 and the monitor elements 70–76 can collect details about events. The external events interface 52 can be comprised of a set of program modules operating on the local system for detecting certain events. These external events can be Simple Network Management Protocol (SNMP) traps from other devices, events from user and system processes.

The monitor elements 70–76 can include code modules that operate on the node for collecting information about certain events and can also include a programming interface for receiving calls from those code modules to pass the notification of the detected event on to the monitor elements. The monitor elements 70–76 can receive event notifications from code that is monitoring any of the enterprise components relevant to the local system, which for the agent 50, can include system events, network events, and SYBASE client/server events. The programming interface of the monitor elements 70–76 can be an exported C++ based API that receives calls from this code upon detection of certain events. For example, the node can be running code for trapping the general protection fault, which can be defined as a system event. The code Will make an API call to the agent 50 to notify the system monitor element 70 of the detected failure, and the system monitor element 70 can pass notification to the correlation processor 64. The API can encapsulate the code's service protocol to remove the operating characteristics of the code from the operation of the other agent components. This allows the detection code to act as plug-in modules that the user can select for configuring which events are to be monitored. Moreover, the user can define events of interest, for monitoring by the agent. Any code suitable for passing event details to any of the monitor elements within the agent 50 can be practiced with the present invention, without departing from the scope thereof.

In particular, the system monitor 70 can collect information about the operation of the local system. To this end, the system monitor 70 can include code modules for collecting information regarding processor load, memory usage, available memory space, and other similar information that is descriptive of the operation of the local workstation or server. The development of such code is well known in the art, and any suitable code can be practiced with the invention without departing from the scope thereof. Also, each agent can take action on the local system such as setting off alarms, activating a beeper, sending a fax via modem, sending e-mail to system administrators or taking corrective action.

In contrast to the system monitor 70, the monitors 72–76 are to monitor events associated with distributed processes. Accordingly, the details relevant to the monitored events require information about the distributed processing operations that are occurring. A realization of the present invention is that the monitors 72–76 can passively collect information about the distributed process by monitoring the network communications that occur during the distributed process. To this end, each monitor element can include an interface to the network communications stack to passively monitor communications between the distributed process elements.

Figure 3:
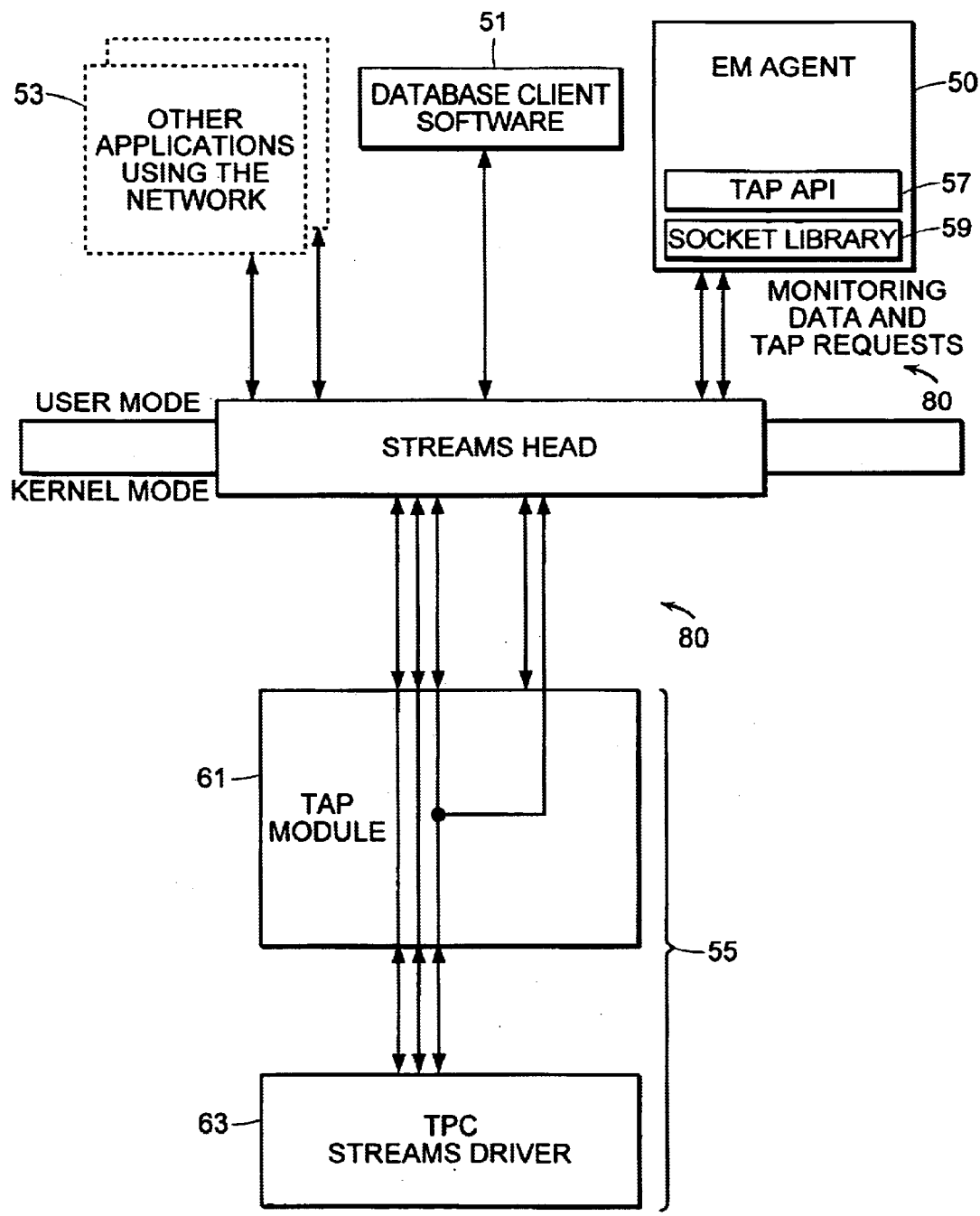
FIG. 3 is an example of an embodiment of a module for collecting details of a distributed process.

FIG. 3 depicts one example of a module 80 for collecting details of a distributed process, and suitable for use on a SUN SOLARIS™ platform. The module 80 monitors the network communications between database software 51 disposed on the local client and a selected group of servers and pass copies of the communications to the agent 50 for processing and for determining which events, if any, have occurred. In particular, the module 80 can enable monitoring by the agent 50 of the local client's database software 51 (e.g., SYBASE, CORBA, ORACLE) or other distributed process applications 53 having traffic that passes through the TCP stack of the managed node.

The module 80 is comprised of an agent 50 and STREAMS modules 55. The agent 50 includes a TAP API 57 and a socket library 59. The STREAMS modules 55, which include a TAP module 61 and a TCP STREAMS driver 63, can be constructed according to well known principles in the art of computer engineering, including those set forth in text Unix Network Programming, by W. Richard Stevens. The STREAMS module 55 may execute in kernel mode, as shown in FIG. 3. The TAP module 61 autopushes on top of the TCP STREAMS stack 65 so that all TCP traffic in and out of the managed node passes through the module 80. The module 80 is aware of the communications protocol for the distributed process or processes being monitored, such as ORACLE or SYBASE. In this way, the module 80 can filter from the traffic those portions that are relevant to the agent 50 and pass copies of this traffic to the agent 50.

Figure 4:
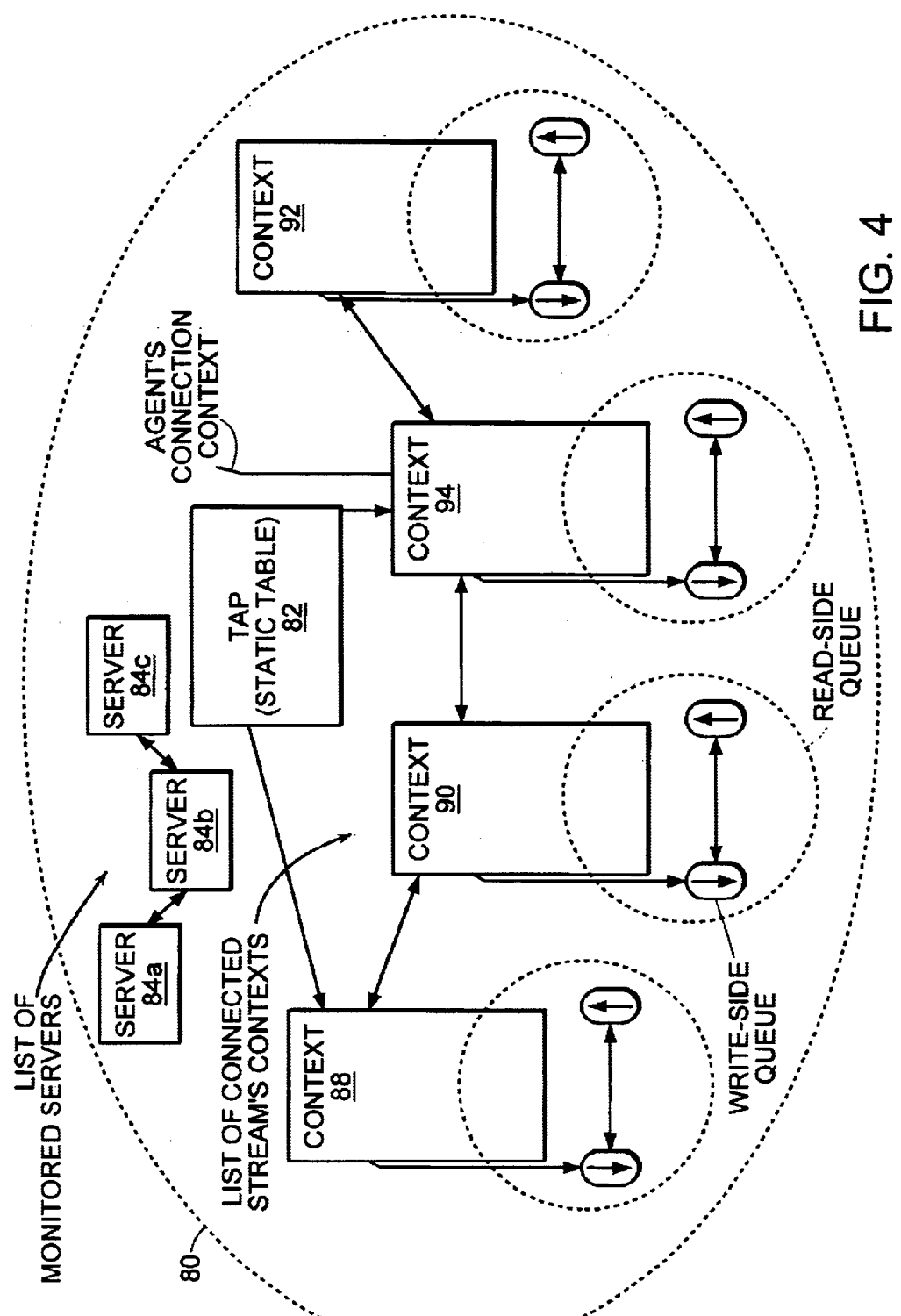
FIG. 4 is a more detailed example of an embodiment of the operational details of a module.

FIG. 4 is a detailed illustration of operational details of the module 80 (as shown in FIG. 3) on the SUN SOLARIS™ platform. The module 80 maintains a list 84 of the servers to be monitored. In one embodiment, the list of servers is provided to the module 80 by the agent 50, which can receive the list from the MUM console 42. All inbound and outbound traffic on connections to the listed servers is passed by module 80 to the agent 50.

In operation, for each connected stream, the module 80 creates a context data structure for storing information. The context is then linked, as shown, to the corresponding STREAMS queues, read and write. The context stores information about the connected stream that describes the type of connection. The module 80 also opens a context data structure 94 for communicating to the agent 50. The module 80 can store data about event details within this context 94, and the agent 50 can read the data out, and pass the information to the correlation processor 64. The tap table 82 stores a list of the connected streams context data structures, the list of all servers being monitored, and the context data structure for communicating with the agent 50.

Each time a connection is established the module creates a context. The module then determines the server address for the connection by generating a sequence of M_IOCTL requests that are sent downstream. Response from the TCP stack is captured and prevented from being sent upstream, and the server IP address is resolved. If the address matches one of the addresses in the list 84, the connection is marked as being monitored, and the module 80 begins monitoring. During monitoring, copies of all traffic sent or received under the context of a monitored connection is passed to the upstream queue of the agent communication context 94, for being passed upstream to the agent 50. In this way the agent 50 receives copies of all traffic for any connection to any of the selected servers.

The information passed upstream by module 80 to the agent 50 is sent to the event correlation processor 58. The event correlation processor is a software module that can process event detail information to determine certain transaction level information. For example, the module 80 can pass a SYBASE logon request to the agent 50. The event correlation processor can receive the logon request and monitor the connection until a logon acknowledge is sent by the SYBASE server. By comparing the time difference between these two events, the event correlation processor 58 can determine a measure of the response time of the distributed process. Other similar metrics that can also be generated to provide end-to-end level analysis of system performance.

Figure 5:
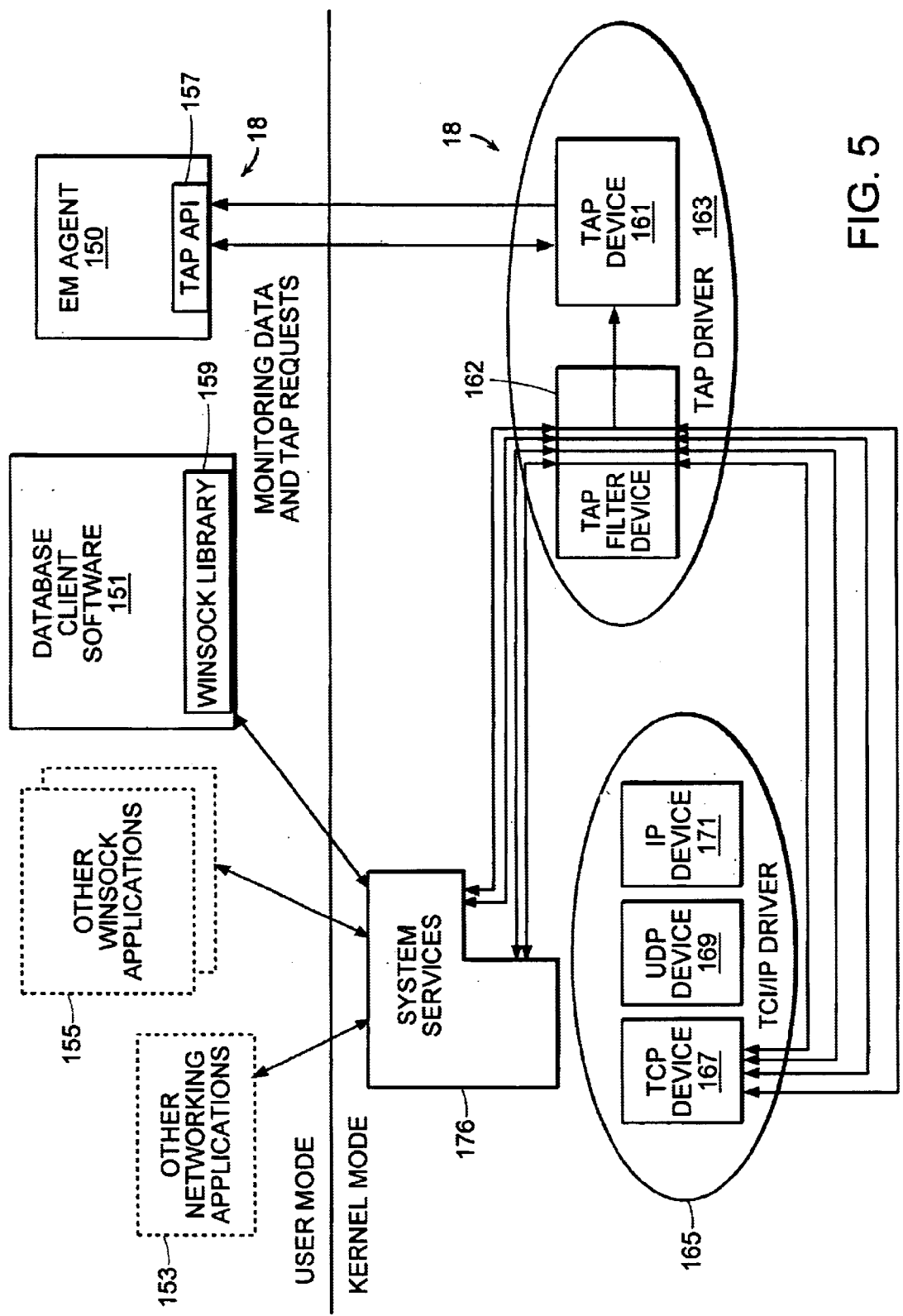
FIG. 5 is another example of an embodiment of a module for collecting details of a distributed process.

FIG. 5 depicts another example of a module 180 for collecting details of a distributed process, and suitable for use on a WNDOWS NT™ platform. The module 180 employs a different architecture than the module 80, but performs the same functions. That is, the module 180 can enable monitoring by the agent 150 of the local client's database software 151 or other distributed process applications 153, 155 having traffic that passes via system services 176 through the TCP stack of the managed node.

The module 180 includes an agent 150 and a TAP driver 163. The agent 150 includes a TAP API 157, and the TAP driver 163 includes a Tap device 161 and a TapFilter device 162. The Tap device 161 communicates with the TAP API 157 to set up monitoring parameters and to supply monitoring data. The TapFilter device 162 attaches on top of the TCP device 167 of the TCP/IP driver 165 to monitor all TCP traffic in and out of the managed node. The TapFilter device 162 uses a feature of the Windows NT™ driver layering architecture to attach itself to the TCP device 167. In particular, the TapFilter device 162 uses an operating system call (i.e., IoAttachDevice) to insert itself into the data stream for the TCP device. Thus, any data to or from the TCP device passes transparently through the TapFilter device 162. The System Services 176, the TAP driver 163, and the TCP/IP driver may execute in kernel mode, as shown in FIG. 5.

The TCP/IP driver 165 also includes a UDP device 169 and an IP device 171 that support other sub-protocols in the TCP/IP family of protocols. Although not shown, the TapFilter device 162 could attach on top of the UDP device 169 and/or the IP device 171 to monitor all data traffic for such devices.

It will be understood that the depicted modules 80 and 180 are only illustrative embodiments of a module for interfacing to the network communication stack. Other modules can be practiced with the invention. For example, referring again to FIG. 1, it can be seen that different types of workstations are depicted in system 10 to show that system 10 is a distributed system having heterogeneous operating environments. The workstations can be of different architectures, both hardware and software, and the servers 20 and 22 can similarly be of different hardware or software architecture. For example, the workstation 12 can be a SUN workstation having a module as depicted in FIG. 2. Moreover, the network system that interconnects the workstations and the servers can be a local area network, a wide area network, a metropolitan area network, or a combination of either. The point is that in a distributed computing architecture the processing that occurs to implement a particular service, whether it is e-mail, a database, a word processing program, or any other service or computer applications, it is distributed across multiple processors that are somehow interconnected for exchanging data.

Data collection activities will now be described. Previous paragraphs set forth a description of the agent, as may be included in a server and client. In paragraphs that follow, the process of monitoring and data gathering in a distributed computer system are described.

Figure 6:
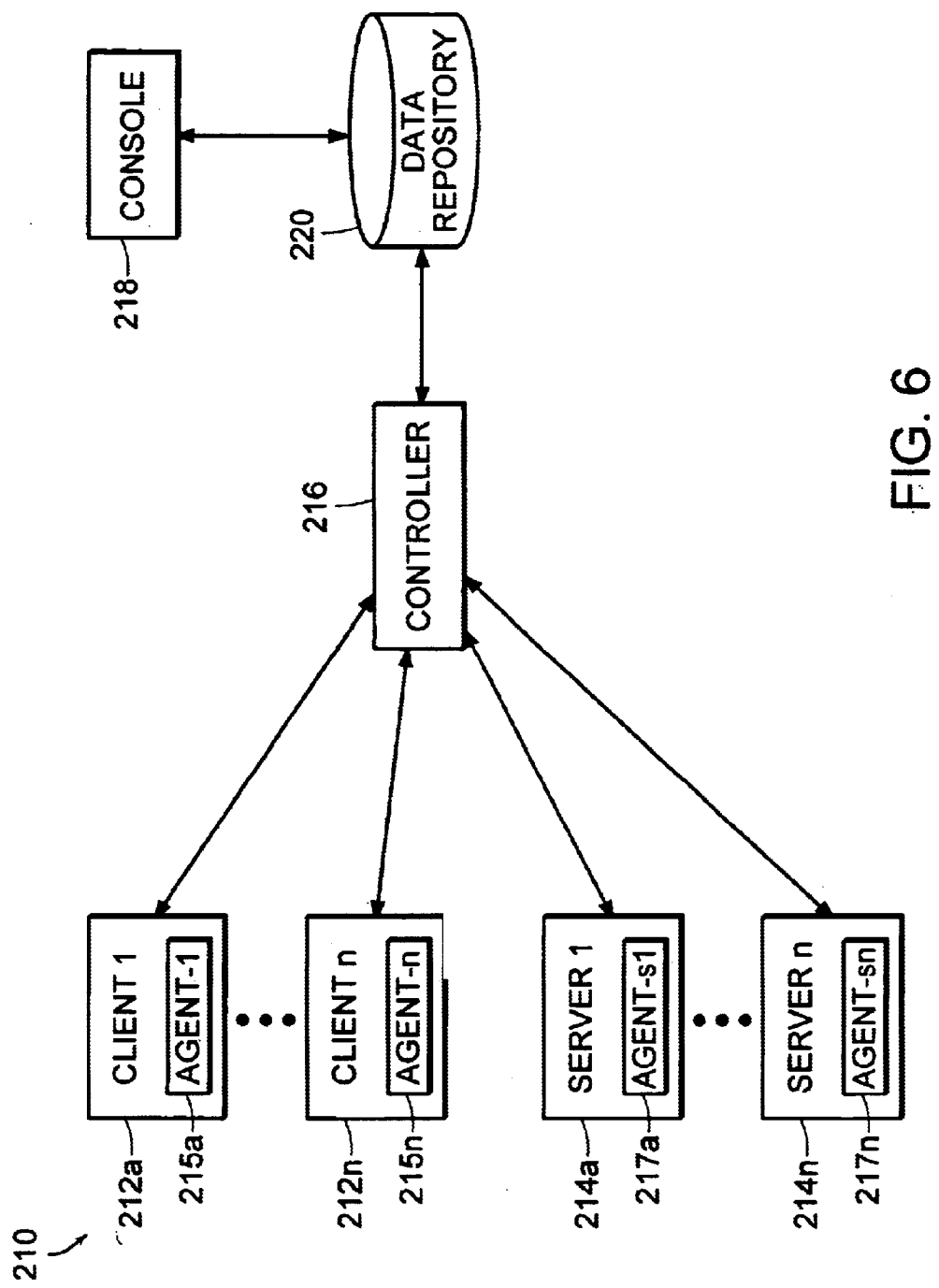
FIG. 6 is an example of an embodiment of a system that may be used in monitoring distributed applications.

Referring now to FIG. 6, shown is an example of an embodiment of a system that may be used in monitoring distributed applications. The embodiment of FIG. 6 includes a system 210 with clients 212a–212n and servers 214a–214n. Also shown is a controller 216 which interacts with the clients 212a–212n and the servers 214a–214n to monitor distributed applications running on the various client and server systems of FIG. 6. The controller 216 reads and writes to a data depository 220. Similarly, the console 218 may read and write data from the data repository 220. Generally, the controller 216, as will be described in paragraphs that follow, is the driver for the data gathering process for monitoring applications executing in the system of FIG. 6. The data is read and written from the data repository 220. The console 218 serves as an interface, for example, for a user wishing to read an interpretation of the data stored in the data repository, such as a new report, or for making changes to various parameters stored in the data repository 220.

It should be noted that the system of FIG. 6 contains elements which are similar to those previously described in conjunction with the system 10 of FIG. 1. For example, the clients 212a–214n may be a workstation or personal computer as shown in the system of FIG. 1. Similarly, the servers 214a–214n may each be one of a database server, such as the Sybase SQL server shown in FIG. 1.

Each of the clients 212a–212n, each of the servers 214a–214n, and the controller 216, for example, represent conceptual functional boxes rather than dedicated hardware processors. In other words, an embodiment in accordance with principles of the invention may have a controller and one or more servers reside on a single system, as well as multiple clients or controller on a single system. In one embodiment, the controller 216 may execute on a dedicated processor due to the amount of traffic and management function that the controller provides. The dedicated processor power is needed for controlling and coordinating the data collection and management process. In other embodiments, the assignment of functions as associated with a client or server and the controller to particular hardware may vary in accordance with the amount of network traffic and client-server transaction, as well as varying processor speeds of the different hardware in the system 210.

In the embodiment of FIG. 6, each of the clients and servers are associated with an agent. For example, associated with client 1 212a is agent 1 215a. Generally, each of the agents is a process executing on a computer system which hosts either the client or associated server application. The agent is the software or the process which detects exception conditions, as will be described in paragraphs which follow. Similarly, the controller 216 is a process or program that is a coordinator for passing information between one of the agents and the console 218. The controller 216 stores and accesses information from the data repository 220.

It should also be noted that another embodiment of the system 210 of FIG. 6 may not include an agent on each server. In other words, in another preferred embodiment, the agent may be optionally included with each server as needed in accordance with each embodiment. The determination of whether an agent is included in each server or as an optional element associated with a server is in accordance with the data gathering requirements of each embodiment.

The data repository 220 in this embodiment is a database created and maintained to store various types of data, such as configuration and usage information in accordance with client-server application activities in the system 210 of FIG. 6. It should be noted that the data repository 220 may also include trigger event data and conditions and thresholds that are described in more detail in paragraphs that follow. Also, in one embodiment, the data repository 220 is a persistent data storage area. Generally, in this embodiment the data stored in a data repository 220 includes monitoring data from monitoring activities between the various client-server connections in the distributed computing environment of the system 210. The data is generally derived from monitoring connections referring to the logical communication medium between a client and the server. What is monitored is the request-response traffic that is transmitted over the connections such as between various clients and servers being monitored. For example, if there is a connection between client 1 and server n, that connection may be monitored and corresponding data collected as events concerning network traffic occurs between client 1 and server n. This data may be collected by the controller and stored in the data repository 220 for various uses, such as reporting out to the user at console 218 activity related to a particular business transaction or connection. More detailed examples and explanation are given in paragraphs to follow with related figures.

What is described in paragraphs that follow is distributed data collection with exception or event triggering in accordance with predefined events and threshold information.

Figure 7:
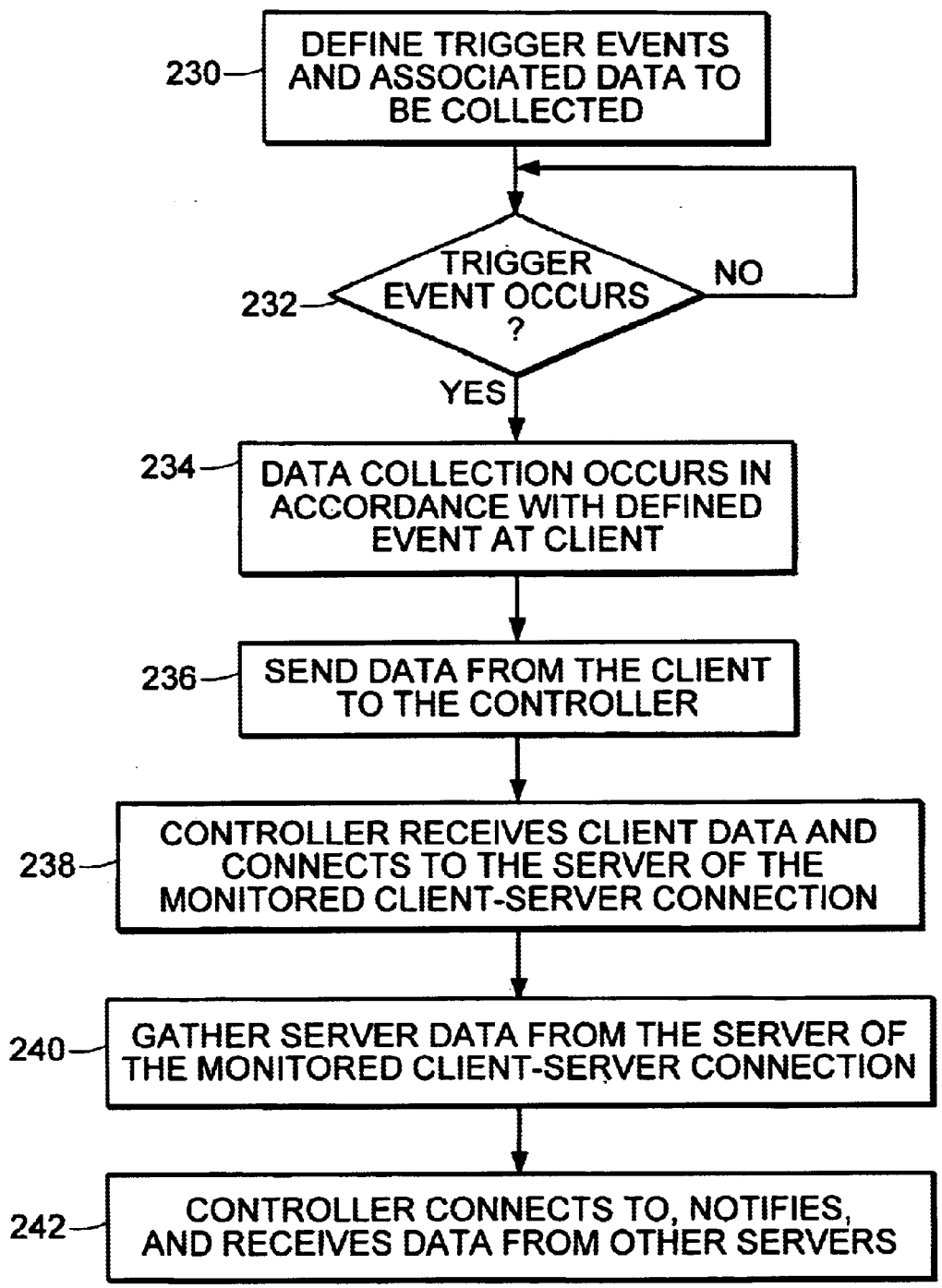
FIG. 7 is an example of an embodiment of steps of a method for gathering performance data.

Referring now to FIG. 7, shown is a flowchart of the steps of a method for gathering performance data in the system 210 of FIG. 6. At step 230, trigger events or exception conditions are defined. Additionally, specific data is identified and associated with various trigger events. In this embodiment, the data associated with specific trigger events may generally be described as diagnostic information and actions. The diagnostic information describes the data collected when trigger events occur, as will be described in paragraphs that follow in conjunction with the processing steps of FIG. 7. The actions generally describe what steps are taken in accordance with the detection of event triggers. Actions may include, for example, sending e-mail, and causing a "beeping" or other multi-media event to occur. Additionally, actions specified may be corrective actions to correct or alleviate some condition in accordance with the defined trigger event. Corrective actions may include, for example, interactions with other computer systems.

It should be noted that the data gathered may generally be described as forming two categories of data with respect to how the data is gathered. Data gathered, from clients and servers for example, may come from an agent or non-agent source. Generally, data that is gathered by the agent is referred to as having an agent data source. All other data that is not gathered by the agent is referred to as having a non-agent data source. Both agent and non-agent data may specified and associated with trigger events in following processing steps.

At step 232, referring to the flowchart of FIG. 7, shown is a wait-loop, or event evaluation loop, where there is test for detecting a trigger event, as defined in step 230. At step 232, if no trigger event is detected control returns back to the top of the loop where there is a constant monitoring until a trigger event occurs. It should be noted that this monitoring may be implemented in different embodiments in a variety of ways known to those skilled in the art. For example, one embodiment may monitor a trigger event by executing a busy wait loop in machine executable code that checks for the occurrence of a trigger event at predetermined time intervals. Another embodiment may monitor and detect trigger events through use of operating system functionality, such as by using asynchronous event and exception condition detection.

It should also be noted that the processing of step 230 may be done at various points in time prior to the event evaluation loop of step 232. In other words, the definition of trigger events may be described as loosely coupled from the detection of trigger events, as performed by step 232 event evaluation loop. The trigger events may be defined "off-line" as a separate task. For example, trigger events may be defined at some previous time on another computer system. The trigger events and associated data may be updated at later time.

Once a trigger event that has been detected in step 232, control proceeds to step 234 where data collection occurs in accordance with the defined event on the client. In other words, in this particular embodiment, the agents as may reside on a client such as client 1 has access to data stored in a client-local data file defining the various trigger events and associated data. This data may be stored in a local copy in each of the client and servers in this embodiment. The agent on the client executes the monitoring activity performed at step 232 and waits for one of the trigger events to occur. When the agent on the client has detected that a trigger event has occurred, it collects data in accordance with the defined events as stored in the data file locally on the client site.

The data file may be stored in both the data repository and locally on each of the client and server sites. Generally, this data describes what particular events are to be monitored and the associated connections as between the various client and servers. For each of the trigger events, the agent as located on each of the clients monitors the activity of the various client-server connections using the monitoring system as previously described in conjunction with earlier figures.

In one embodiment, it should be noted that when there is a modification or update to the data file stored in the data repository, the controller synchronizes the various copies of the data as used by the clients and servers. In other words, if there is an update or modification to the data file, for example, adding new trigger events as with an off-line editing process, the various copies of the data as used by the clients and servers are synchronized with the copy in the data repository. The controller is responsible for detecting this update and ensuring that each client or server is accessing a common version of the data file.

For each of these requests being monitored by the agent, tasks attached to the monitored connection are evaluated using evaluation context information. The evaluation context generally includes information related to the connection being monitored. The evaluation context may include, for example, the command being executed by an application along with information regarding the user, the server and other information related to an application request. When a trigger event or exception condition occurs, data collection occurs on the client, as in step 234. Data gathered at step 234 may be included as evaluation context information. Generally, the type of data gathered at this point by the agent on a client has to do with those parameters or variables that can be computed by the client. These are typically items such as resource metrics regarding CPU and memory usage for the system upon which the client executes, as well as network parameters, such as latency which may be relevant to the client-server connection.

It should be noted that in addition to running the agent on each of the client systems, a user specified program may additionally, or alternatively be executed, and interact with the client process to gather state information, for example, for other products and processes that may be executing within the system 210 of FIG. 6.

At step 236, data, including the evaluation context information, is sent from the client to the controller 216. At step 238, the controller 216 receives the client data and connects to the server of the particular monitored client-server connection about which data has just been reported from an agent executing on a client system. For example, if there is a connection being monitored between client 1 and server 1, and an alarm condition or trigger event is detected by agent 1 215a executing within the process of client 1 212a, the controller 216 is notified of the occurrence of this alarm condition. Subsequently, the controller 216 receives the data as reported from client 1 212a and connects to server n, 214n in step 238. At step 240, server data is gathered from the server of the particular monitored client-server connection. This contact and control is initiated by the controller 216. In this capacity, the controller 216 acts as a coordinator or a driver of the data gathering process once it is notified of the occurrence of a trigger event or exception condition by one of the clients known as client 1 212a.

At step 238, the controller uses various pieces of information as communicated by the client to decide what server is to be contacted at step 238. At step 240, the controller 216 gathers server data from the server of the monitored client-server connection. This data may include, for example, number and type of current open transactions, the number of requests being serviced by the server, and various usage statistics similar to those previously collected on behalf of a client. It should also be noted that similar to that previously described with a client, a user-specified program or process may also be executed on a controller machine and associated with a controller process 216 to gather state information maintained by products and software other than those identified in the system 210 of FIG. 6.

At step 240, server data is gathered from the server of the monitored client-server connection. The data gathered from the server includes variables or parameters that may be defined in a file or other data repository for which a local copy exists on each of the servers and clients in the system 210 of FIG. 6. Similar to the previous description associated with the client, the server contacted may access data from a local file to determine what variables or parameters it computes, and subsequently transmits back to the controller 216. At step 242, the controller additionally connects to, notifies, and receives data from any other server involved in the monitored client-server connection. These other servers, for example, at step 242 may include servers that assist or handle transactions related to the monitored client server connection.

It should be noted that similar to that previously described with a client and a controller, a user-specified program or process may also be executed and associated with a server process to gather state information. The process, for example, may be other software not identified in the system 210 of FIG. 6.

Figure 8:
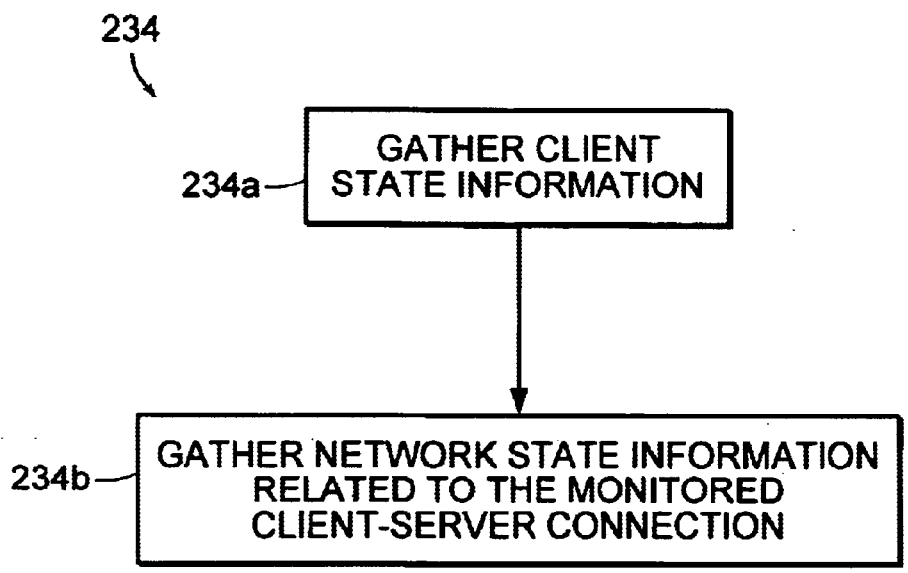
FIG. 8 is an example of an embodiment of detailed steps of data collection in accordance with a defined event on a client.

Referring now to FIG. 8, shown are more detailed steps in a flowchart of one embodiment of data collection in accordance with a defined event on a client. At step 234a, the client gathers client state information as defined in accordance with the particular trigger event. At step 234b, network state information related to the monitored client server connection is also gathered. As previously described, this may include information such as network latency time in processing the monitor client-server connection.

Figure 9:
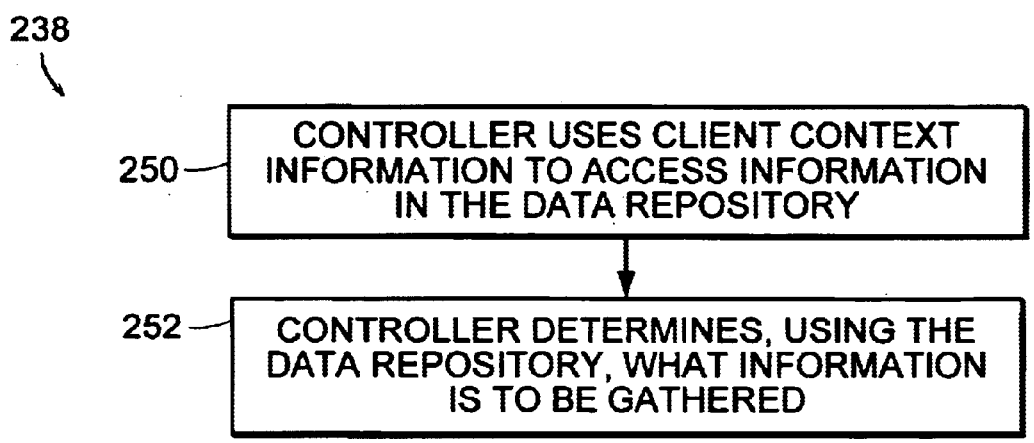
FIG. 9 is an example of an embodiment of detailed steps for determining how a controller receives client data and establishes server connections.

Referring now to FIG. 9, shown are more detailed steps in a flowchart for determining how the controller receives client data and establishes connections with the server or servers. At step 250, the controller uses client context information to access other information in the data repository 220. This client context information may include data, such as a exception identifier, sent from one of the client systems whose agent is monitoring a client server connection. Using this identifier, the controller indexes into information stored in a data repository to determine, as at step 252, what information is to be gathered from the client. The controller determines using the data repository, for example, what servers or other processes in the system of FIG. 6 it needs to contact to obtain data in the monitoring or data gathering process.

Figures 10, 11:
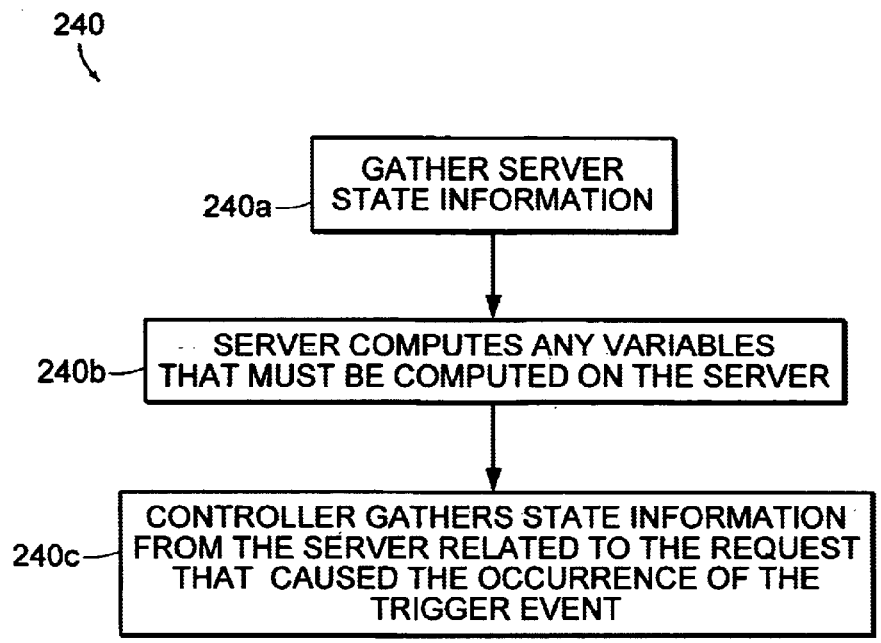
FIG. 10 is an example of an embodiment of a method of detailed steps for how server data may be gathered.
FIG. 11 is an example of an embodiment of a table that may be included in the data repository of the system of FIG. 6.

Referring now to FIG. 10, shown is a flowchart with more detailed steps for how server data may be gathered from the server of the monitored client-server connection as previously described in conjunction with step 240 of FIG. 7. At step 240a, server state information is gathered. Server state information may include, for example, as previously described, non-agent data from the server such as the number of open transactions and the number of requests currently being serviced by a particular server. Generally, this non-agent data and other server state information may be gathered by the agent process executing and associated with a particular server, such as 214n. At step 240b, the server computes any variables or parameters that must be computed on the server in accordance with those defined in the local copy of the event data file stored on the particular server. At step 240c, the controller gathers the state information from the server related to the request that caused the occurrence of the trigger event originally established by or detected by the client of the client server connection being monitored.

Referring now to FIG. 11, shown is an example of an embodiment of a table as stored in the data repository 220 and locally on each of the clients and servers in this embodiment defining conditions related to various trigger events or exceptions. Generally, this table includes data that is an example of configuration data, as may be entered at step 230 of FIG. 7, as previously described. This table may be used, for example, in determining what variables are to be collected by each of the clients and servers in the various processing steps previously described in conjunction with FIG. 7. This embodiment of the table 260 includes an exception identifier 262, an associated threshold 264, data identifiers and component types for data collection 266, and the system components 268 that are contacted for performing a data gathering related to the monitoring process.

The exception identifier 262 is an identifier which uniquely identifies an exception or a trigger event in the system 210 of FIG. 6. Associated with each of the exception conditions is a threshold value 264. In the table of FIG. 1, the threshold may be a time value or other threshold established associated with the exception identifier. For example, if an exception identifier is associated with the amount of time required to service a request, the threshold value, such as five seconds, may specify a maximum time period above which an alarm condition or trigger event is detected by the agent executing as a client process. Column 266 specifies various data identifiers identifying data items to be collected in the different component types which compute or are responsible for reporting these various data identifiers. For example, a data identifier "A" may be computed by each of the servers or server processes associated with this particular exception. Data identifiers "B" and "C" may be reported or gathered from each of the clients involved in this client server connection.

The system components for data gathering are defined in column 268. For example, each of the client systems identified in column 268 are contact to produce and provide the corresponding data identifier parameter in column 266. For example, if in column 268 both server 4 and server 5 are identified, both of these servers are contacted to supply values for the parameter "A", as identified in column 266. Similarly, in column 268 if client 1 is identified, and parameters "B" and "C" are identified in column 266, client 1 is contacted for values for parameters "B" and "C". The controller may use the information stored in table 260, for example, in determining which client and server systems to be contacted for what parameter values. The controller, for example, may examine column 268 of the table to determine from what client and server systems to contact to gather data for the particular connection being monitored. The data stored in column 266 identifies what data parameters or variables the controller expects to receive from each of the client-server systems as identified in column 268.

Referring now to FIG. 12, shown is an example of an embodiment of a table of various cached values for the different data parameters collected in monitoring a distributed application executing in the system of FIG. 6. The cache values of the table 280 include the data collection identifier 282, a description of the data being collected 284, and a cached value and component of the system which is associated with that data value 286. For example, the data collection identifier A describes client CPU time. In row 1 of table 280, a cached value of three seconds is associated with client 1 for the parameter A. A similar statistic is kept regarding client CPU time for client 2 in row 2.

In one embodiment, this caching of the values is only stored for controller variables or statistics which are monitored by the controller. In another embodiment, the statistics which are cached include those as stored in table 280 of FIG. 12 for the client and servers as well. Statistics such as these may be kept by the controller 216. These values may be stored in a data repository 220 and accessed and maintained by the controller 216 to minimize traffic in the system of FIG. 6. In another embodiment, each of the clients as well as the servers may access and update information in the data repository regarding various variables or data collection parameters rather than just the controller. However, in this embodiment, it may be desirable that only the controller access and maintain the data in the data repository 220 related to the caching information as stored in table 280 to minimize the amount of traffic on the network to enable more efficient data collection in monitoring of applications executing in the computer system 210 of FIG. 6. It should be noted that statistics such as these included in the table 280 of FIG. 12 may be used in reporting information such as by the console 218.

It should generally be noted that the thresholds as specified in conjunction with field 264 of FIG. 11 may be time-based or other data quantities in accordance with the type of data being collected. Additionally, the various data values and parameters stored in the data repository 220 are propagated to the clients and servers if their existed change in the data. As previously described, each of the clients and servers as well have access to the data and parameters it needs. The data set may include a complete set of data, as stored in the tables of FIGS. 11 and 12, or it may include portions thereof as related to the various client and server parameters.

The data contained in table 260 of FIG. 11 includes configuration information relating to the physical layout of the computer system 210 of FIG. 6. Data such as this configuration information is generally only required to be read by the controller process 216. Other data such as those parameters related to data gathering on a server or client may be conceptually separated from the data such as the configuration information and stored in different places in accordance with the needs of the client and server processes.

Generally, the system 210 of FIG. 6 describes a process for remotely gathering server data from an agent. This remote data collection facility, such as by executing the agent software on a client and a server in a system of FIG. 6, may alternatively be provided through other software on the various clients and servers. For example, within a particular database, certain data gathering capabilities may be included in an application programming interface (API) of the database. Equivalently, if such capabilities regarding transaction information for the database are not provided by the database, such as through an API, these capabilities may be alternatively provided by agent processes, such as 215a–215n and 217a–217n ot clients and servers to obtain and gather the data needed by the controller.

It should also be noted that the embodiment of the agent process, as on client and servers, previously described in conjunction with FIG. 7 provides for data gathering and performance monitoring upon the occurrence of trigger event or exception conditions. Additionally, data gathering may be performed on a periodic basis rather than upon the occurrence of certain trigger events. In other words, for example, referring back to FIG. 7, rather than have event triggering and detection being performed at steps 232 and forming a wait loop, the defined trigger events and data may be corrected, for example, in a periodic basis such as in accordance with a predetermined time increment. Data gathering on a periodic basis, for example, may be used to gather usage statistics in accordance with a "snapshot" of various aspects of the system 210 of FIG. 6 at particular time increments.

In one particular embodiment, the system of FIG. 6 may have one or more client processes, such as 212a through 212n, which execute on a computer system having an operating system that is one of Windows 95, 98 or Window NT by Microsoft™. The controller may also execute on a computer system that hosts the Windows NT operating system. Similarly, one of the servers 214a–214n may execute on a computer system having a Unix or Windows NT operating system. In the embodiment described in conjunction with FIG. 6, each of the computer systems upon which the client and server processes, and the controller process execute are able to communicate using the TCP protocol.

The techniques and embodiments just described present a method for monitoring and managing the performance of distributed applications in the computer system. This technique is based on triggering event initiation when a condition occurs or upon a period basis upon which data is collected from one or more distributed application components in the computer system 210 of FIG. 6. As previously described, components may include client and server computer systems, as well as a dedicated processor for each of the controller component and a database server.

The monitoring data may be collected in a remote fashion and may be used to diagnose problems as well as analyze system performance. The foregoing system includes a controller as the main coordinator in an attempt to minimize the overhead required to collect data from the various client server components. The controller coordinates requests for data collection items from the different components in the computer system 210. The data statistics and information gathered and stored in the data repository 220 of FIG. 6 may be analyzed and reported to a user such as through the console 218 to help identify causes and display information regarding system performance. This real-time event in data collection capability present a technique which is flexible for monitoring the performance of distributed applications executing in the computer system 210 of FIG. 6. It should generally be noted that these remote data gathering capabilities may be applied to other areas in addition to those for a distributed computing system environment.

In one embodiment, different threads may execute in the context of an agent process to perform different tasks previously described in conjunction with FIG. 7. For example, a resource gathering thread may compute the values for all the resource variables or parameters on a client. A periodic evaluation thread may evaluate client tasks as specified in accordance with a predetermined time period. A non-periodic evaluation thread may evaluate application tasks when there is activity on a client server connection being monitored. The use of threads in the foregoing description is in accordance with the function provided by the operating system and other software executing on each of the different processors included in the computer system 210 of FIG. 6.

In one embodiment, the clients and servers to be monitored, as well as type version, login and password information for each server to be evaluated, are included in the configuration information, as may be stored in the data repository 220. A user, for example, may specify this configuration information through the console 218.

A task or application may be "attached" or associated with a client and/or server if it is to be evaluated for the client and/or server and the connection between them. Generally, for an application, a name, various exceptions, conditions and one or more actions and state variables may be specified. The application is attached or associated with a particular connection by specifying which machines and/or servers and connections it is to be evaluated for. A client application may be attached to a client machine in which the agent executing on that client evaluates that application. An application may be attached to a client and a server, for example, in which an agent or a non-periodic evaluation thread of that agent evaluates that application when there is activity associated with a particular client-server connection. A server application may be attached to a server in which the agent executing on the various server processor evaluates that application periodically.

It should be noted that in an embodiment of the console 218 provides for automatic data collection as well as provides different facilities for user interface, such as to modify parameters and allow for user specified options, such as specifiying time periods associated with periodic evaluation, and creation and maintenance of a business transaction file.

In some embodiments, it is possible to associate the triggering data and the data that is collected by the system with various applications or operations performed by the applications, deemed "transactions."

Figure 13:
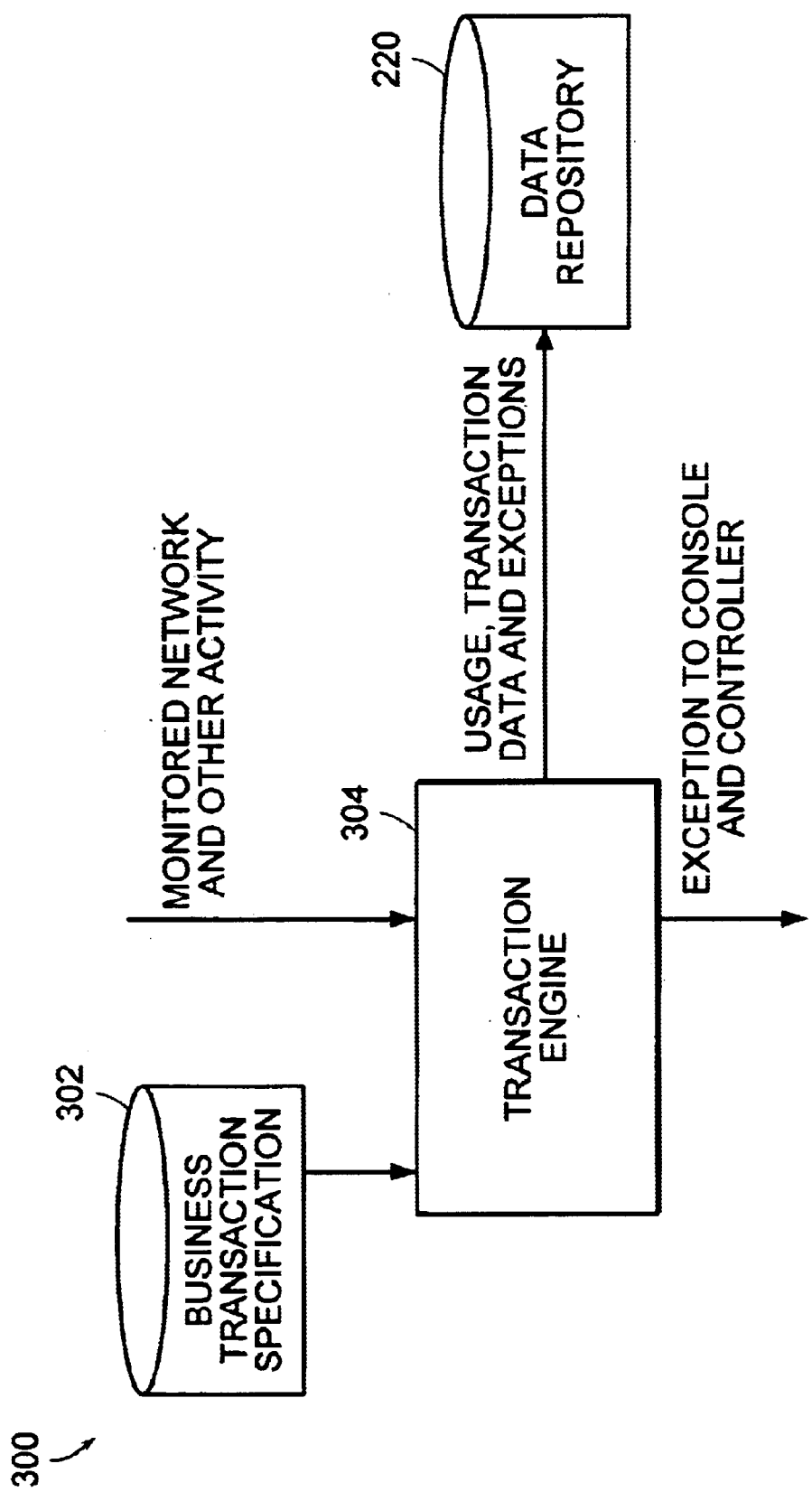
FIG. 13 is an example of an embodiment of a business transaction system.

Referring to FIG. 13, a business transaction system 300, for facilitating monitoring such application business transactions, includes a business transaction specification 302 that contains data indicating definitions and rules for associating specific network information with particular application business transactions. The business transaction specification 302 is described in more detail hereinafter.

The business transaction specification data 302 is provided to a transaction engine 304 which uses the business transaction specification 302 and the monitored network and other activity to produce usage data, transaction data and exceptions. As described in more detail hereinafter, the transaction engine 304 can recognize portions of the monitored activity from the network that are associated with business transaction set forth in the business transaction specification 302. Based on the association and the rules provided therewith in the business transaction specification 302, the transaction engine 304 generates application transaction specific usage, transaction data, and exceptions, that are stored in the data repository 220.

It should be noted that activity that is monitored generally includes network and other activity, such as user interface activity, remote system activity and system process activity. The user interface activity may include, for example, user initiated activity associated with a user interface, such as selection of a button with a mouse device. Remote system activity may include, for example, activity relating to other computer systems remotely connected to the system 210 of FIG. 6. System process information may include, for example, CPU usage information.

Figure 14:
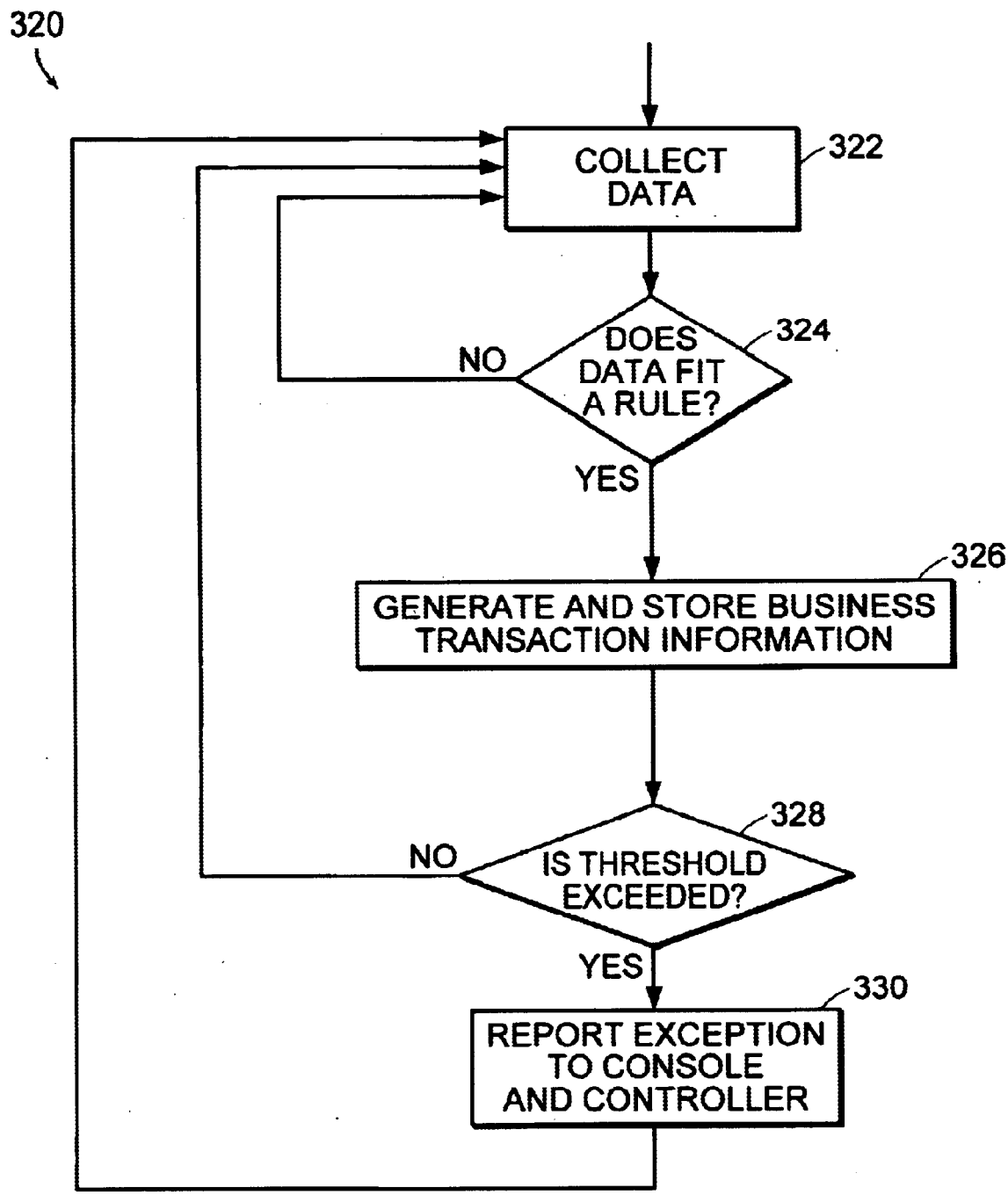
FIG. 14 is an example of an embodiment of a flowchart depicting method steps of basic operation of the transaction engine.

Referring to FIG. 14, a flowchart 320 illustrates basic operation of the transaction engine 304 of FIG. 13. At a first step 322, the transaction engine collects data corresponding to the monitored activity from the network. Following the step 322 is a test step 324 which determines if the collected data fits a rule of the business transaction specification 302. The rules of the business transaction specification 302 may be defined on a per application basis and listed in a particular order such that the collected data is matched against each rule in succession. Once the application is determined, the collected data may be matched with rules in the business transaction specification 302 by looking for a portion thereof that matches the application which is associated with the network data.

Note that the data can be associated with a particular application by examining the port number and the IP address of the destination that is contained in the network packet information. Each time a new port is created, the network information indicating the application, port, and IP address is entered in a table. Using the table, network data can be matched with a particular application by looking up the port number and the IP address in the table. Note also that the process ID can be used to distinguish between different users accessing the same application using the same port. Thus, if user one and user two both access application A using port B, then transactions for user one can be tracked separately from transaction for user two by distinguishing between the process ID's for network data. Note that, as described elsewhere herein, the process ID's, port ID's, and IP addresses of data is obtained and provided by the agents.

It should be noted that the data collection that occurs at step 322 is performed in conjunction with the occurrence of a trigger event. In one instance, the data associated with a trigger event may be collected when a transaction completes and exceeds a threshold, such as a predetermined amount of time. In another instance, the data associated with a trigger event may be collected when the transaction does not complete. In this other instance, data collection occurs and the transaction is treated in an manner analogous to that of the first instance.

If it is determined at the test step 324 that the data does not fit a particular rule, control passes back to the step 322 where more data is collected. Otherwise, if it is determined at the step 324 that the data does correspond to a particular rule, then control passes from the step 324 to a step 326 where the transaction engine 304 generates and stores business transaction information.

Following step 326 is a test step 328 which determines if a threshold in the business transaction specification 302 is exceeded. Besides associating the data with particular applications, the business transaction specification 302 contains information indicating particular thresholds for various transactions. For example, the business transaction specification 302 may indicate that, following a first operation, a second operation should be performed within a predetermined amount of time. If the first operation occurs but the second operation is delayed, then a threshold will be exceeded. Examples of these types of operations include a request for data and receipt of data or a request to open a first window followed by a request to open a second window.

If it is determined at the step 328 that a threshold has not been exceeded, then control passes from the step 328 back to the step 322 to collect additional network data. Otherwise, if it is determined at the step 328 that a threshold has been exceeded, then control passes from the step 328 to a step 330 where the fact that the threshold has been exceed is reported to the console and to the controller to take appropriate action, as set forth elsewhere herein.

Figure 15:
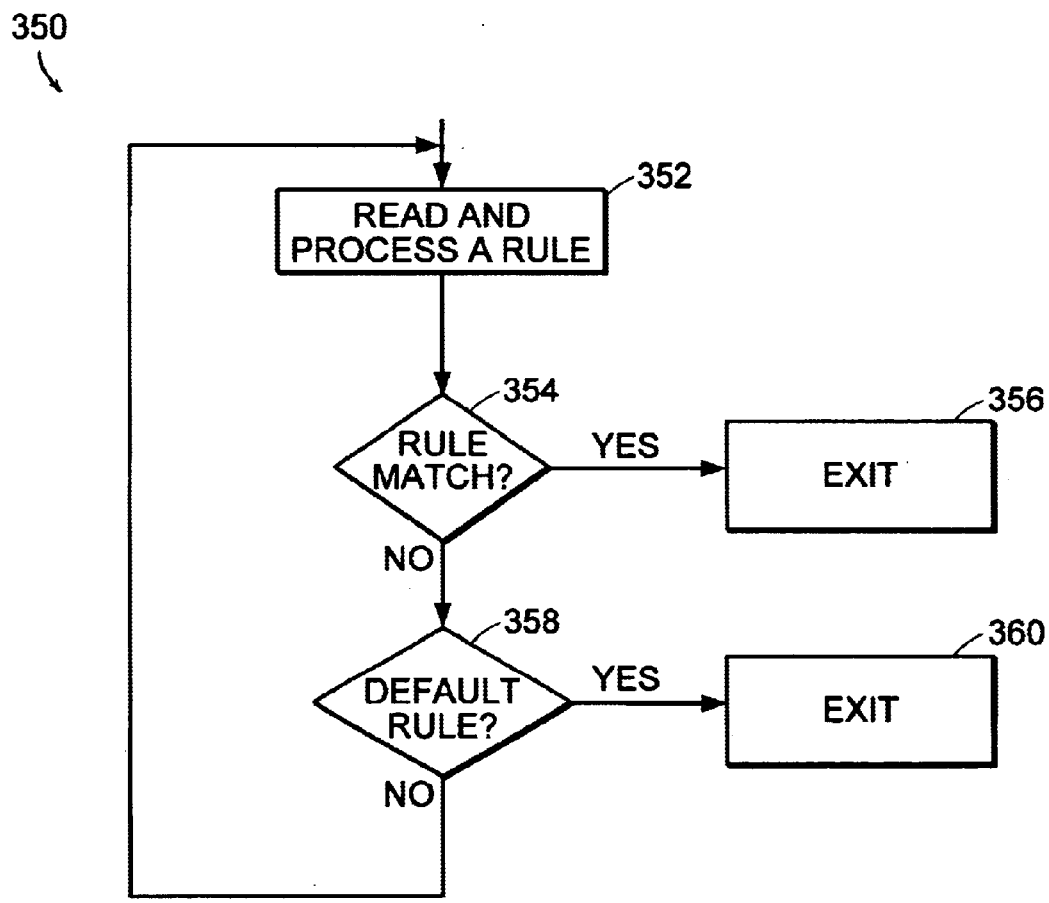
FIG. 15 is an example of an embodiment of a flowchart depicting detailed steps for determining if data fits a rule of the business transaction specification.

Referring to FIG. 15, a flowchart 350 shows in more detail the step 324 of FIG. 14 where it is determined if data fits a rule of the business transaction specification 302. At a first step 352, a rule is read and processed. Note that rules may be specified in any one of a variety of conventional fashions, including providing a text file that has a particular syntax indicating each rule and the operations and tests thereof.

Following with step 352 is a test step 354 where it is determined if the rule matches the data being processed. If so, then control passes from the step 354 to a step 356 where the routine exits. Otherwise, if it is determined at the test step 354 that the data does not match the particular rule being processed (i.e., the rule fetched at the step 352), then control passes from the step 354 to a test step 358 to determine if a default rule is to be applied. If it is determined at the test step 358 that the default rule is be applied, then control passes from the step 358 to a step 360 where the routine is exited. Otherwise, if it is determined at the step 358 that the default rule does not apply, then control passes from the step 358 back to the step 352 to process the next rule. In one embodiment, the default rule may be the last rule in the business transaction specification 302.

Figure 16:
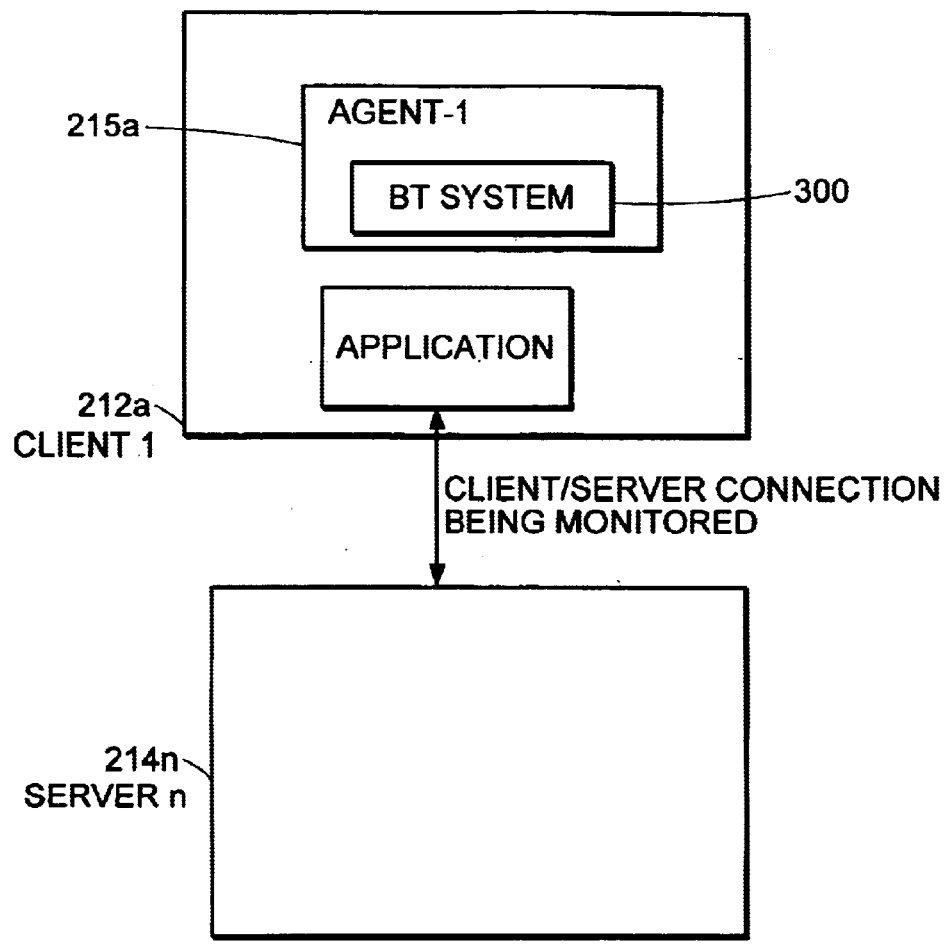
FIG. 16 is an example of an embodiment of a schematic diagram of the relationship between the business transaction system and an agent.

Referring to FIG. 16, a schematic diagram shows the relationship between the business transaction system 300 and the agent 215a. As the agent 215a is monitoring data, that data is passed to the business transaction engine 304 which, as described above, uses the business transaction specification 302 to provide usage, transaction data, and exceptions to the data repository 220 as well as providing exceptions to the console and the controller of the system, as described elsewhere herein.

Figure 17:
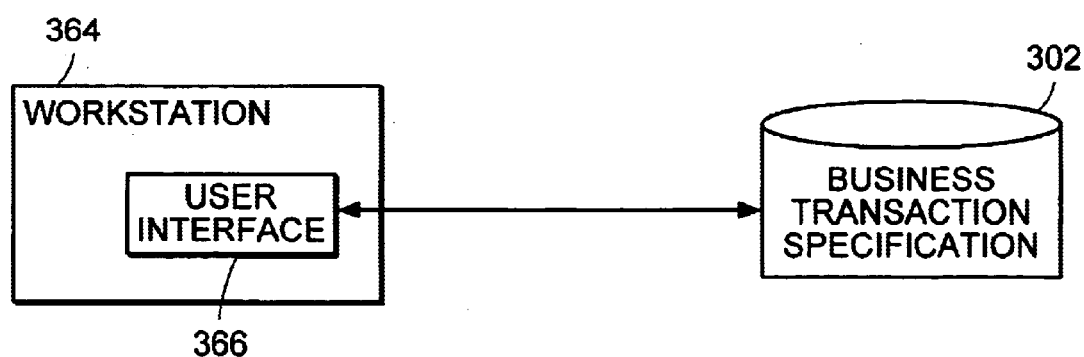
FIG. 17 is an example of an embodiment of a block diagram of system components for maintaining the business transaction specification.

Referring to FIG. 17, a work station 364 includes a user interface 366 that is used to edit and create the business transaction specification 302. The business transaction specification 302 may be implemented as a conventional text file. In that case, the work station 364 and the interface 366 are provided by a conventional computer and word processor. Alternatively, the business transaction specification 302 may be specified using other conventional means.

In embodiments where the business transaction specification 302 is implemented as a text file, it is possible, in some instances, for the transaction engine 304 to read the business transaction specification 302 upon initialization and then create a run-time dynamic data structure that may be accessed more efficiently in connection with providing the functionality described herein.

It should also be noted that in one embodiment the business transaction specification 302 may be stored in the data repository 220 of FIG. 6.

A possible syntax for providing the business transaction specification 302 is provided below:

```
<BTSpecification>     -> <BTLangVersion> <BTApplicationSpec>+
<BTLangVersion>       -> Version <number>.<number>
<BTApplicationSpec>   -> Application <string-literal> <HeaderInfo> <BTRule>+
                         <ProcessRule>*
<HeaderInfo>          -> [ <HeaderEntry>+ ]
<BTRule>              -> BT <string-literal> <RuleClauses> END_BT
<ProcessRule>         -> PROCESS <ProcClause>+END_PROCESS
<ProcClause>          -> BT <string-expr>
<HeaderEntry>         -> (<NumericEntry> <number>)* (<StringEntry> <string-literal>)*
<NumericEntry>        -> NoiseThreshold        |
                         MaxTransactionTime    |
                         GuiProcess            |
                         DiscardTimedOutTransaction |
<StringEntry>         -> WindowsToIgnore       |
                         ClassesToIgnore
<RuleClause>          -> <WindowClause>* <CommandClause>* <GeneralClause>*
<WindowClause>        -> WindowStart           |
                         WindowEnd             |
                         WindowEndNew          |
                         WindowPrevious        |
                         WindowContains        |
                         StatusText            |
                         MenuCommand           |
                         WindowFilter          |
                         ButtonClick           |
                         <string-expr>
<WindowClause>        -> WindowIgnore          |
                         WindowList
                         <string-list>
<CommandClause>       -> CommandStart          |
                         CommandEnd            |
                         CommandContains
                         <command> <params>
<CommandClause>       -> CommandList
                         <command-list>
<command>             -> Select                |
                         Update                |
                         Delete                |
                         Execute               |
                         URL                   |
                         Insert                |
                         BeginTransaction      |
                         EndTransaction
<GeneralClause>       -> Max (BytesSent | BytesReceived|   roundTrips |
                         Operations) (<number>) |
                         Min (BytesSent | BytesReceived|   roundTrips |
                         Operations) (<number>)   |
                         SetName <string-literal>
<string-expr>         -> <string-expr> OR <string-expr>
<string-expr>         -> NOT (<string-expr>)
<string-expr>         -> <string-literal>
<string-list>         -> <string-list>, <string-literal> | <string-literal>
<string-literal>      -> 'string'   |
                         'string' ( <params> )
<params>              -> <params> <param>| 'string'
```

A comment is any line whose first character is '#'.

It will thus be seen that the invention efficiently achieves the objects set forth above. Moreover, it will be understood that various substitutions, additions and modifications can be made to the invention without departing therefrom and that embodiments depicted and described are merely illustrative of the invention and are not to be read in a limiting sense; with the scope of the invention defined by the following claims to the fullest extent allowed by the terms therein.

What is claimed is:

1. A method of monitoring a distributed computer system, said method comprising:
   defining a plurality of trigger events and for each one of said plurality of trigger events defining associated data to be collected;
   monitoring a connection between a client and a first server;
   while monitoring said connection, detecting at said client an occurrence of one of said plurality of trigger events;
   as a result of detecting said occurrence,
      (i) collecting client data at said client and in accordance with the detected trigger event, the collected client data being the defined associated data for that detected trigger event;
      (ii) notifying a controller of the occurrence of the detected trigger event and sending the client data to said controller;
      (iii) notifying said first server of the occurrence of the detected trigger event;
      (iv) gathering first server data by said first server; and
      (v) sending the gathered first server data to said controller.

2. The method of claim 1, wherein said controller is remote from said client and said first server.

3. The method of claim 2, wherein said client is remote from said first server.

4. The method of claim 3 further comprising:
   gathering a client portion of said associated data by said client that can be computed by said client.

5. The method of claim 4, wherein said client portion includes information relevant to said connection between said client and said first server.

6. The method of claim 5, wherein said client portion includes resource metrics.

7. The method of claim 6, wherein said resource metrics include processor and memory usage information.

8. The method of claim 5, wherein said client portion includes network latency information relevant to said connection.

9. The method of claim 3, further including:
   sending to said controller client context information; and
   determining, using said client context information, data to be obtained from said client.

10. The method of claim 9, further including:
    said controller using data included in a data repository to determine what data is to be obtained from said client.

11. The method of claim 10, said client context information includes a server identifier uniquely identifying said first server.

12. The method of claim 3, wherein said collecting data on said client includes:
    specifying a machine executable program to perform said collecting data on said client; and
    executing said machine executable program to collect said data on said client.

13. The method of claim 3 further comprising:
    notifying one or more other servers of said occurrence of said trigger event;
    gathering other server data by said one or more other servers; and
    sending said other server data to said controller.

14. The method of claim 3 further comprising:
    sending said client data to said controller.

15. The method of claim 3, wherein said first server data includes information about current open transactions being processed by said first server.

16. The method of claim 3, wherein said first server data includes usage information about said first server.

17. The method of claim 3 further comprising:
    gathering, by said controller, information about the trigger event that caused an exception.

18. The method of claim 3, wherein said client and said first server are each associated with an agent process that gathers data.

19. The method of claim 3, wherein said controller is a coordinator for gathering client and first server data.

20. The method of claim 1, wherein said distributed computer system includes one or more clients and one or more servers, each of said one or more clients and said one or more servers being associated with a different computer processor and being a process executing on said computer processor.

21. The method of claim 20, wherein said controller is a process executing on a dedicated computer processor.

22. The method of claim 1, wherein said distributed computer system includes one or more clients and one or more servers, and a computer processor is associated with at least two clients, each of said two clients being a process executing on said computer processor.

23. A system for monitoring a distributed computer system, the monitoring system comprising:
    machine executable code for defining a plurality of trigger events and for each one of said plurality of trigger events defining associated data to be collected;
    machine executable code for monitoring a connection between a client and a first server;
    machine executable code for detecting at said client and while monitoring said connection an occurrence of one of said plurality of trigger events;
    machine executable code for collecting, as a result of detecting said occurrence, client data at said client and in accordance with the detected trigger event, the collected client data being the defined associated data for that detected trigger event;
    machine executable deescode for notifying, as a result of detecting said occurrence, a controller of the occurrence of the detected trigger event, and sending the client data to said controller;
    machine executable code for notifying, as a result of detecting said occurrence, said first server of the occurrence of the detected trigger event;
    machine executable code for gathering, as a result of detecting said occurrence, first server data by said first server; and
    machine executable code for sending, as a result of detecting said occurrence, the gathered first server data to said controller.

24. The system of claim 23 further comprising:
    machine executable code for gathering a client portion of said associated data by said client that can be computed by said client.

25. The system of claim 24, wherein said client portion includes information relevant to said connection between said client and said first server.

26. The system of claim 25, wherein said client portion includes resource metrics.

27. The system of claim 26, wherein said resource metrics include processor and memory usage information.

28. The system of claim 25, wherein said client portion includes network latency information relevant to said connection.

29. The system of claim 23, further including:

machine executable code for sending to said controller client context information; and machine executable code for determining, using said client context information, data to be obtained from said client.

30. The system of claim 29, further including:

said controller including machine executable code for accessing data included in a data repository to determine what data is to be obtained from said client.

31. The system of claim 30 wherein said client context information includes a server identifier uniquely identifying said first server.

32. The system of claim 23, wherein said distributed computer system includes one or more clients and one or more servers, each of said one or more clients and said one or more servers being associated with a different computer processor and being a process executing on said computer processor.

33. The system of claim 32, wherein said controller is a process executing on a dedicated computer processor.

34. The system of claim 23 further comprising:

machine executable code for sending said client data to said controller.

35. The system of claim 23, wherein said first server data includes information about current open transactions being processed by said first server.

36. The system of claim 23, wherein said first server data includes information about requests being serviced by said first server.

37. The system of claim 23, wherein said first server data includes usage information about said first server.

38. The system of claim 23 further comprising:

machine executable code for gathering, by said controller, information about the trigger event that caused the exception.

39. The system of claim 23, wherein said machine executable code for collecting client data performs remote data gathering by said controller.

40. The system of claim 23, wherein said machine executable code for collecting data on said client includes:

machine executable code for specifying a machine executable program to perform said collecting data on said client.

41. The system of claim 23 further comprising:

machine executable code for notifying one or more other servers of said occurrence of said trigger event;

machine executable code for gathering other server data by said one or more other servers; and machine executable code for sending said other server data to said controller.

42. The system of claim 23, wherein said distributed computer system includes one or more clients and one or more servers, and a computer processor is associated with at least two clients, each of said two clients being a process executing on said computer processor.

43. The system of claim 23, wherein said client and said first server are each associated with an agent process that gathers data.

44. The system of claim 23, wherein said controller is a coordinator for gathering client and first server data.

* * * * *